(12) United States Patent
Zhang et al.

(10) Patent No.: US 10,756,547 B2
(45) Date of Patent: Aug. 25, 2020

(54) DATA LINE USED IN A MOBILE PHONE

(71) Applicants: AGOLD COMMUNICATION (SHANGHAI) CO., LTD., Shanghai (CN); SHANGHAI UNIHERTZ E-COMMERCE CO., LTD., Shanghai (CN)

(72) Inventors: He Zhang, Shanghai (CN); Qishan Zhang, Shanghai (CN); Laibang Xue, Shanghai (CN); Xing Wang, Shanghai (CN)

(73) Assignees: AGOLD COMMUNICATION (SHANGHAI) CO., LTD., Shanghai (CN); SHANGHAI UNIHERTZ E-COMMERCE CO., LTD., Shanghai (CN)

( * ) Notice: Subject to any disclaimer, the term of this patent is extended or adjusted under 35 U.S.C. 154(b) by 0 days.

(21) Appl. No.: 16/611,826

(22) PCT Filed: Dec. 19, 2018

(86) PCT No.: PCT/CN2018/121962
§ 371 (c)(1),
(2) Date: Nov. 7, 2019

(87) PCT Pub. No.: WO2019/192212
PCT Pub. Date: Oct. 10, 2019

(65) Prior Publication Data
US 2020/0127473 A1     Apr. 23, 2020

(30) Foreign Application Priority Data

Apr. 3, 2018  (CN) .......................... 2018 1 0292113

(51) Int. Cl.
*H02J 7/00* (2006.01)

(52) U.S. Cl.
CPC ........ *H02J 7/00034* (2020.01); *H02J 7/0045* (2013.01); *H02J 7/0047* (2013.01); *H02J 7/00304* (2020.01); *H02J 7/00308* (2020.01)

(58) Field of Classification Search
CPC ............... H02J 7/00034; H02J 7/00308; H02J 7/00304; H02J 7/0045; H02J 7/0047; H02J 7/00; H02J 7/0029
(Continued)

(56) References Cited

U.S. PATENT DOCUMENTS

2005/0062879 A1* 3/2005 Ohsuga ............. H04N 5/23241
                                                          348/372
2008/0231587 A1* 9/2008 Takahashi ............ G09G 3/3611
                                                          345/101

(Continued)

*Primary Examiner* — Eugene Yun
(74) *Attorney, Agent, or Firm* — Leong C. Lei (57) ABSTRACT

A data line used in a mobile phone is disclosed. The data line used in a mobile phone includes a body, a first connection terminal, a second connection terminal, and connection lines connecting said first and second connection terminals are disposed inside said body; wherein said connection lines include two core data communication lines and two core voltage lines; said data line further includes a display screen disposed outside said body, and a DSP chip, a voltage detecting circuit, and/or a current detecting circuit disposed inside said body. Performing the data line used in a mobile phone of the present invention can monitor the voltage and/or current flowing through the data line in real time, and detect hidden dangers in time and eliminate the probability of damage during charging of the mobile phone.

10 Claims, 4 Drawing Sheets

(58) Field of Classification Search
USPC .......................................................... 455/573
See application file for complete search history.

(56) References Cited

U.S. PATENT DOCUMENTS

2016/0027373 A1\* 1/2016 Han ..................... G09G 3/2092
                                                                     345/212
2020/0013365 A1\* 1/2020 Liu ...................... G09G 3/3677

\* cited by examiner

DATA LINE USED IN A MOBILE PHONE

RELATED APPLICATIONS

The present application is a National Phase of International Application Number PCT/CN2018/121962, filed on Dec. 19, 2018, and claims the priority of China Application 201810292113.1, filed on Apr. 3, 2018.

BACKGROUND OF THE INVENTION

1. Field of the Invention

Embodiments of the present disclosure relate to a mobile phone, and more particularly to a data line used in a mobile phone.

2. Discussion of the Related Art

Charging of a mobile phone or data transfer between a mobile phone and an external device is often accomplished by using a data line connection. However, in the prior art, when the mobile phone is connected to the data line for charging, the charging electric quantity state can only be obtained by turning on the mobile phone, but the charging voltage and current entering the mobile phone from the data line cannot be monitored in real time, once the charging terminal of the data line is released excessive voltage or current can cause damage to the mobile phone. Therefore, it is necessary to monitor the voltage and/or current flowing through the data line in real time, and it is possible to detect hidden dangers in time and eliminate the probability of damage during charging of the mobile phone.

SUMMARY

The technical problem to be solved by the present invention is to provide a data line used in a mobile phone, which can monitor the voltage and/or current flowing through the data line in real time, and detect hidden dangers in time and eliminate the probability of damage during charging of the mobile phone.

To achieve above-mentioned object of the claimed invention, an embodiment of the present invention provides a data line for a mobile phone, including a body, a first connection terminal for connecting an external device, a second connection terminal for connecting a mobile phone, and connection lines connecting the first connection terminal and the second connection terminal; wherein the connection lines include two core data communication lines for data sending or receiving and two core voltage lines for voltage transferring;

said data line further includes a display screen disposed outside said body, and a DSP chip, a voltage detecting circuit, and/or a current detecting circuit disposed inside said body;

a first end of said DSP chip is connected to a first end of said voltage detecting circuit, a second end of said DSP chip is connected to a first end of said current detecting circuit, and a third end of said DSP chip is connected to said display screen;

a second end of said voltage detecting circuit is connected to one core of said two core voltage lines, and a third end of said voltage detecting circuit is grounded;

a second end and a third end of said current detecting circuit are connected in series to the other core of said two core voltage lines so as to achieve the connection between said first connecting terminal and said second connecting terminal.

Advantageously, said data line used in a mobile phone further includes a voltage stabilizing circuit disposed inside said body, and one end of said voltage stabilizing circuit is connected in parallel with said voltage detecting circuit on the same core voltage line, and the other end is grounded.

Advantageously, said data line used in a mobile phone further includes an overvoltage and overcurrent protection circuit disposed inside said body, said overvoltage and overcurrent protection circuit is connected in series to one core of said two core voltage lines connecting between said first connection terminal and said voltage detecting circuit, thereby achieving connection with said first connection terminal and said voltage detecting circuit, and said overvoltage and overcurrent protection circuit is also connected to a fourth end of said DSP chip.

Advantageously, said data line used in a mobile phone further includes a temperature detecting circuit disposed inside said body, and said temperature detecting circuit is connected with a fifth end of said DSP chip.

Advantageously, said voltage detecting circuit includes a first voltage dividing resistor and a second voltage dividing resistor connected in series, one end of said first voltage dividing resistor is connected to one core of said two core voltage lines, the other end of said first voltage dividing resistor is connected with one end of said second voltage dividing resistor to form a joint end which is connected to said first end of said DSP chip, the other end of said second voltage dividing resistor is grounded.

Advantageously, said current detecting circuit includes a sampling resistor in parallel with an integrated operational amplifier chip, said sampling resistor is also connected in series with the other core of said two core voltage lines to achieve the connection with the said connection terminal and said second connection terminal, said integrated operational amplifier chip is also connected to said second end of said DSP chip.

Advantageously, the interface type of said first connection terminal is USB-TYPE-A or USB-TYPE-B.

Advantageously, the interface type of said second connection terminal is any of micro USB, micro USB to Lightning and micro USB to USB-TYPE-C.

Advantageously, said voltage stabilizing circuit is formed by a voltage stabilizing diode of the type ZD101, said overvoltage and overcurrent protection circuit is formed by an overvoltage/overcurrent protection chip of the type SGM2525, and said temperature detecting circuit is formed by a temperature sensor of the type NTC101.

Advantageously, the type of said DSP chip is MS1793 which is provided with ADC pins respectively connected to said voltage detecting circuit, said current detecting circuit, said overvoltage and overcurrent protection circuit and said temperature detecting circuit, GPIO and I2C pins connected to said display screen and integrated with Bluetooth communication function, said integrated operational amplifier chip is of the type SGM8477, said first voltage dividing resistor has a resistance of 1MΩ, said second voltage dividing resistor has a resistance of 100 KΩ.

Performing the data line used in a mobile phone of the present invention will bring out the following beneficial effects:

Firstly, in the embodiment of the present invention, since the voltage detecting circuit and the current detecting circuit are disposed on the two core voltage lines of the data line, the voltage and/or current collected by the voltage detecting circuit and the current detecting circuit are transmitted to the display screen for displaying in real time through the DSP chip, so that the voltage and/or current flowing through the data line can be monitored in real time when the mobile phone is charged, the hidden dangers are discovered and eliminated, and the probability of damage during charging of the mobile phone is reduced;

Secondly, in the embodiment of the present invention, since the voltage stabilizing circuit is further disposed on the two core voltage lines of the data line, the high voltage pulse may be prevented from leaking to the mobile phone for causing damage to the mobile phone charging system;

Thirdly, in the embodiment of the present invention, since an overvoltage and an overcurrent circuit are further provided on the two core voltage lines of the data line, when the voltage or current is too high, the connection of the two core voltage lines are actively disconnected, thereby avoiding the damage to the mobile phone charging system caused by overvoltage or overcurrent;

Fourthly, in the embodiment of the present invention, since the temperature detecting circuit is further provided on the two core voltage lines of the data line, when the temperature is too high, the connection of the two core voltage lines are actively disconnected, thereby avoiding the damage to the mobile phone caused by the high temperature.

BRIEF DESCRIPTION OF THE DRAWINGS

In order to more clearly illustrate the embodiments of the present invention or the technical solutions in the prior art, the drawings used in the embodiments or the description of the prior art will be briefly described below. Obviously, the drawings in the following description are only certain embodiments of the present invention, and other drawings can be obtained from those skilled in the art without any creative work.

DETAILED DESCRIPTION OF THE EMBODIMENTS

The technical solutions in the embodiments of the present invention are clearly and completely described in the following with reference to the drawings in the embodiments of the present invention. It is obvious that the described embodiments are only a part of the embodiments of the present invention, and not all of the embodiments. All other embodiments obtained by those skilled in the art based on the embodiments of the present invention without creative efforts are within the scope of the present invention.

Figure 1:
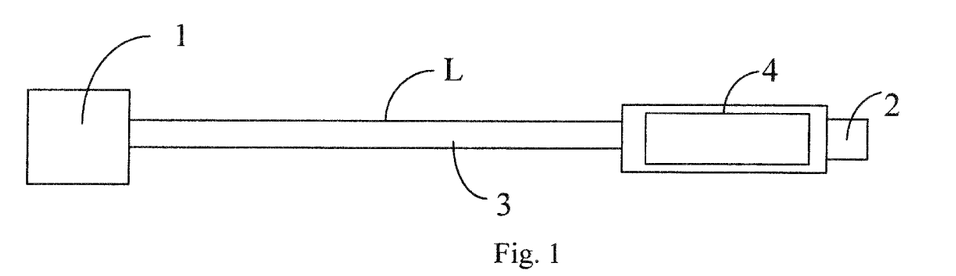
FIG. 1 is a schematic structural diagram of an external plane of a data line used in a mobile phone according to an embodiment of the present invention.
Figure 2:
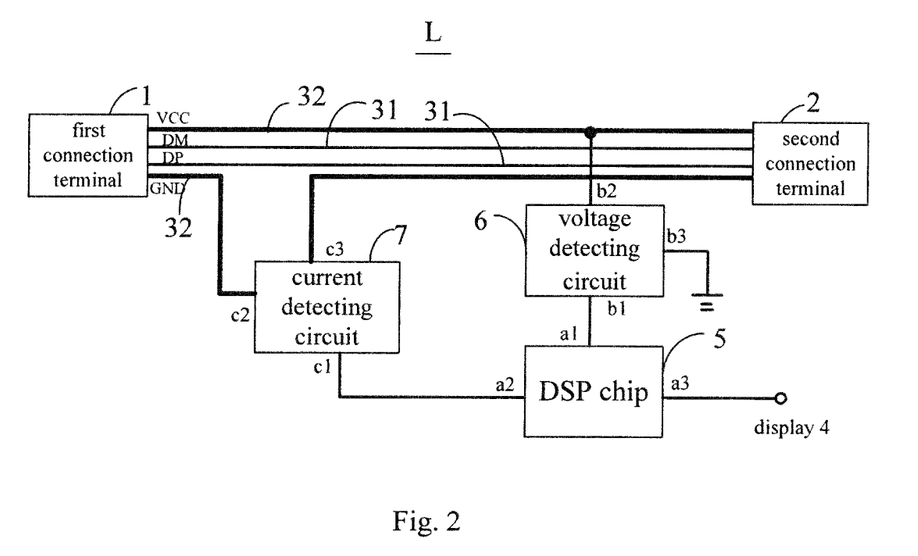
FIG. 2 is a schematic structural diagram of an internal system of a data line used in a mobile phone according to an embodiment of the present invention.
Figure 3:
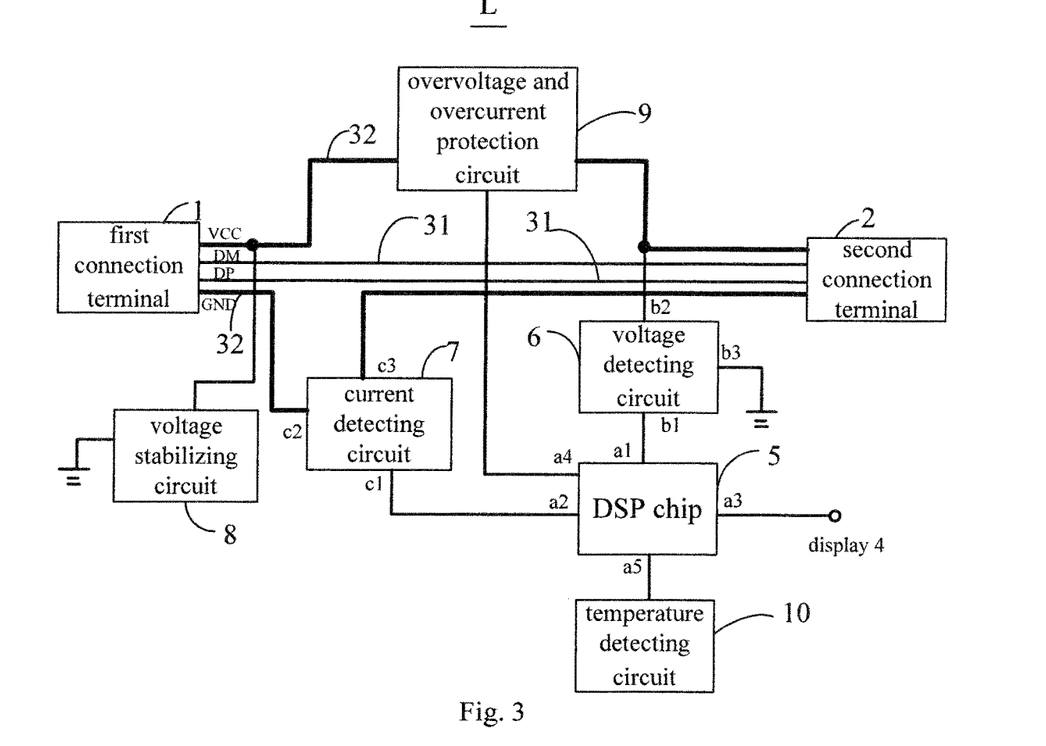
FIG. 3 is a schematic structural diagram of another internal system of a data line used in a mobile phone according to an embodiment of the present invention.

Referring to FIGS. 1-6, an embodiment of a data line used in a mobile phone of the present invention is provided which includes a body L, a first connection terminal 1 for connecting an external device (not shown, the external device includes a computer, a charger, etc.), a second connection terminal 2 for connecting a mobile phone (not shown), and connection lines 3 connecting the first connection terminal 1 and the second connection terminal 2; wherein the connection lines 3 include two core data communication lines 31 for data sending or receiving and two core voltage lines 32 for voltage transferring;

The data line in the embodiment of the present invention further includes a display screen 4 disposed outside the body L, and a DSP chip 5, a voltage detecting circuit 6, and/or a current detecting circuit 7 disposed inside the body L;

The first end a1 of the DSP chip 5 is connected to the first end b1 of the voltage detecting circuit 6, the second end a2 of the DSP chip 5 is connected to the first end c1 of the current detecting circuit 7, and the third end a3 of the DSP chip 5 is connected to the display screen 4;

The second end b2 of the voltage detecting circuit 6 is connected to one core of the two core voltage lines 32, and the third end b3 of the voltage detecting circuit 6 is grounded. The second end c2 and the third end c3 of the current detecting circuit 7 are connected in series to the other core of the two core voltage lines 32 so as to achieve the connection between the first connecting terminal 1 and the second connecting terminal 2.

It should be noted that the data line in the embodiments of the present invention may be based on a conventional four-core or multi-core data line (such as including but not limited to a USB data line), and through applying the voltage detecting circuit 6 and/or the current detecting circuit 7 on the voltage line of the conventional data line, the voltage and/or current flowing in real time when the mobile phone is charged can be detected and then can be pushed to the display screen 4 for real-time display after received by the DSP chip 5, thereby realizing real-time monitoring of the voltage and/or current flowing through the data line when the mobile phone is charged, discovering and eliminating the hidden dangers in time, and reducing the probability of damage during charging of the mobile phone.

It can be understood that the interface type of the first connection terminal 1 connected to the external device includes but is not limited to USB-TYPE-A, USB-TYPE-B; the interface type of the second connection terminal 2 connected to the mobile phone can be different according to different interfaces of the mobile phone. The interface type of the second connection terminal 2 includes but is not limited to micro USB, micro USB to Lightning, micro USB to USB-TYPE-C. The display screen 4 is a liquid crystal screen or other screen.

In one embodiment, the two core data communication lines 31 are respectively set to DM and DP, and the two core voltage lines 32 are respectively set to VCC and GND, and the interface type of the external device of the first connection terminal 1 is USB-TYPE-A, and the interface type of the connection terminal 2 connected to the mobile phone is micro USB, and the display screen 4 is a liquid crystal screen; at this time, the voltage detecting circuit 6 is connected to the VCC line of the two core voltage lines 32, and the current detecting circuit 7 is connected in series with the GND line of the two core voltage lines 32, the DSP chip 5 employs a functional chip having an MCU.

In another embodiment, the two core data communication lines 31 are respectively set to DM and DP, and the two core voltage lines 32 are respectively set to VCC and GND, and the interface type of the external device of the first connection terminal 1 is USB-TYPE-A, the interface type of the second connection terminal 2 connected to the mobile phone is micro USB to Lightning, and the display screen 4 is a liquid crystal screen; at this time, the voltage detecting circuit 6 is connected to the VCC line of the two core voltage lines 32, and the current detecting circuit 7 is connected in series with the GND line of the two core voltage lines 32, the DSP chip 5 employs a function chip having an MCU and Bluetooth communication. For example, the type of the DSP chip 5 is MS1793, which is provided with ADC pins respectively connected to the voltage detecting circuit 6 and the current detecting circuit 7, GPIO and I2C pins connected to the display screen 4, and integrated with Bluetooth communication function.

In the embodiment of the present invention, as shown in FIG. 3, in order to avoid damage to the charging system of the mobile phone caused by the high-voltage pulse leaking to the mobile phone end during charging of the mobile phone, the data line in the embodiment of the present invention further includes a voltage stabilizing circuit 8 disposed inside the body L. One end of the voltage stabilizing circuit 8 is connected in parallel with the voltage detecting circuit 6 on the same core voltage line 32, and the other end is grounded.

Similarly, in order to avoid damage to the charging system of the mobile phone caused by overvoltage or overcurrent during charging of the mobile phone, the data line in the embodiment of the present invention further includes an overvoltage and overcurrent protection circuit 9 disposed inside the body L, wherein the overvoltage and overcurrent protection circuit 9 is connected in series to one core of the two core voltage lines 32 connecting between the first connection terminal 1 and the voltage detecting circuit 6, thereby achieving connection with the first connection terminal 1 and the voltage detecting circuit 6, and the overvoltage and overcurrent protection circuit 9 is also connected to the fourth end a4 of the DSP chip 5, so that when the current flowing through the voltage line 32 exceeds a preset current threshold, the first connection terminal 1 and the second connection terminal 2 are switched by the DSP chip 5, or the voltage flowing through the voltage line 32 exceeds a preset voltage threshold, the voltage is automatically adjusted to a voltage threshold within a certain period of time, and the output power is not lowered, and after a certain period of time, the connection between the first connection terminal 1 and the second connection terminal 2 is switched by the DSP chip 5.

Similarly, in order to avoid damage to the mobile phone charging system caused by high temperature during charging of the mobile phone, the data line in the embodiment of the present invention further includes a temperature detecting circuit 10 disposed inside the body L, and the temperature detecting circuit 10 is connected with the fifth end a5 of the DSP chip 5. When the temperature of the data line in the embodiment of the present invention is too high, the connection between the first connection terminal 1 and the second connection terminal 2 is switched by the DSP chip 5.

In one embodiment, the voltage stabilizing circuit 8 is formed by a voltage stabilizing diode of the type ZD101, the overvoltage and overcurrent protection circuit 9 is formed by an overvoltage/overcurrent protection chip of the type SGM2525, and the temperature detecting circuit 10 is formed by a temperature sensor of the type NTC101, thereby quickly releasing the surge generated by the plugging and unplugging of the charger, and preventing damage from the internal overvoltage, overcurrent and over temperature phenomena.

The voltage stabilizing diode ZD101 is connected in parallel with the voltage detecting circuit 6 on the VCC line of the two core voltage lines 32. The voltage stabilizing diode ZD101 is a super-powered transient suppression diode which will be turned on to release the energy higher than 6V/14V when the voltage is higher than 6V/14V. The overvoltage/overcurrent protection chip SGM2525 is connected in series on the VCC line of the two core voltage lines 32, and is connected to the first connection terminal 1 and the voltage detecting circuit 6 through the VCC line. The overvoltage/overcurrent protection chip is also connected to the DSP chip 5 for receiving the overvoltage and overcurrent protection command. The temperature sensor NTC101 is connected to the DSP chip 5 for sending the collected temperature to the DSP chip 5.

Figure 4:
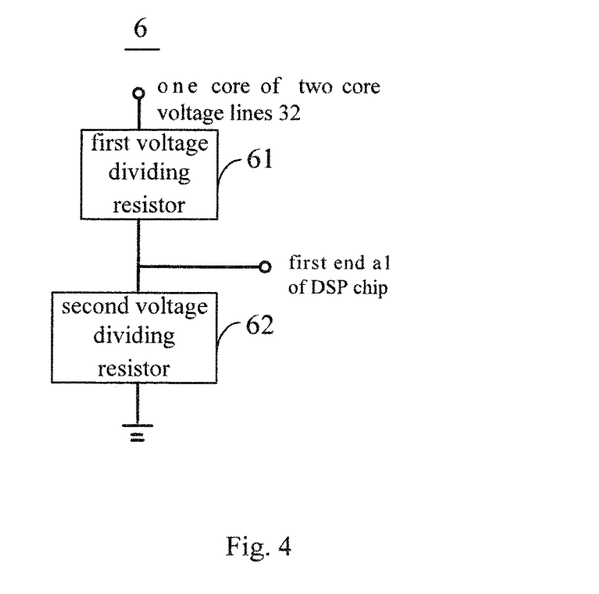
FIG. 4 is a schematic system structural diagram of a voltage detecting circuit shown in FIG. 2 and FIG. 3.

In the embodiment of the present invention, as shown in FIG. 4, the voltage detecting circuit 6 includes a first voltage dividing resistor 61 and a second voltage dividing resistor 62 connected in series; wherein one end of the first voltage dividing resistor 61 is connected to one core of the two core voltage lines 32, the other end of the first voltage dividing resistor 61 is connected with one end of the second voltage dividing resistor 62 to form a joint end which is connected to the first end a1 of the DSP chip 5, the other end of the second voltage dividing resistor 62 is grounded. In one embodiment, the first voltage dividing resistor 61 has a resistance of 1 MΩ, the second voltage dividing resistor 62 has a resistance of 100 KΩ, and the first voltage dividing resistor 61 is connected to the VCC line of the two core voltage lines 32, the second voltage dividing resistor 62 is grounded, so that the DSP chip 5 collects a voltage of 1/11.

Figure 5:
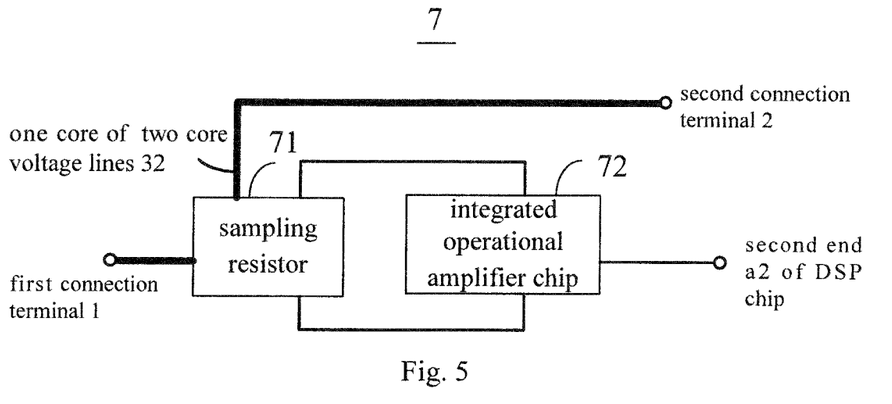
FIG. 5 is a schematic system structural diagram of a current detecting circuit shown in FIG. 2 and FIG. 3.

In the embodiment of the present invention, as shown in FIG. 5, the current detecting circuit 7 includes a sampling resistor 71 in parallel with an integrated operational amplifier chip 72. The sampling resistor 71 is also connected in series with the other core of the two core voltage lines 32 to achieve the connection with the first connection terminal 1 and the second connection terminal 2. The integrated operational amplifier chip 72 is also connected to the second end a2 of the DSP chip 5. It should be noted that the integrated operational amplifier chip 72 can avoid lacking reasonable installation space due to excessive components. In one embodiment, the integrated operational amplifier chip 72 is of the type SGM8477, and the sampling resistor 71 has a resistance of 1 Ω. The sampling resistor 71 is connected in series on the GND line of the two core voltage lines 32.

Figure 6:
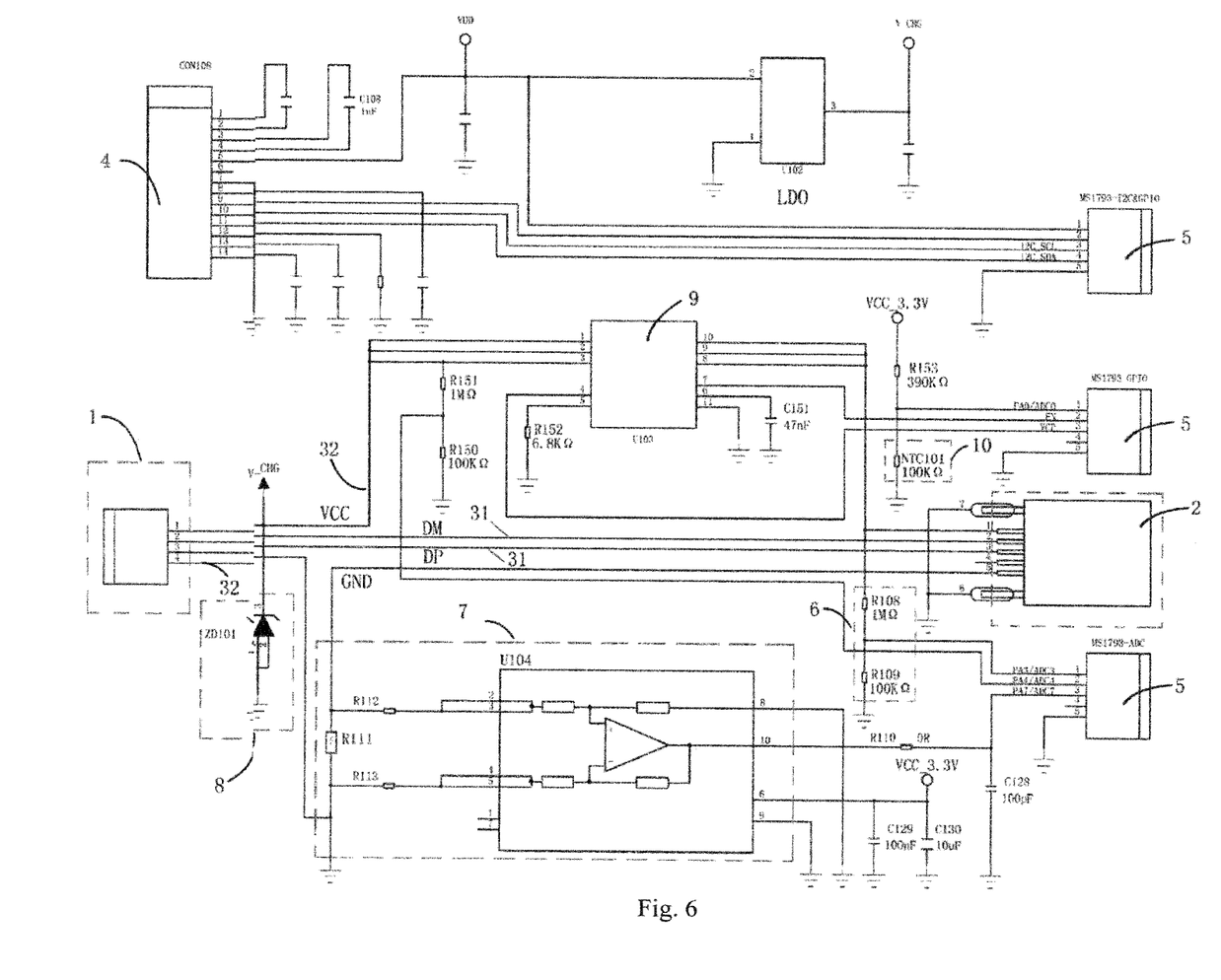
FIG. 6 is a circuit application diagram of an internal system structure of a data line used in a mobile phone according to an embodiment of the present invention.

FIG. 6 is a circuit application diagram of an internal system structure of a data line in an embodiment of the present invention. In FIG. 6, USB-TYPE-A is the first terminal 1 for connecting to a computer, charger, etc., micro USB is the second terminal 2 for connecting the mobile phone.

The 1-4 connecting lines arranged between USB-TYPE-A and micro USB are the connecting lines 3, wherein the second and third connecting lines respectively correspond to the DM and DP of the two core data communication lines 31, and the first and fourth connecting lines respectively correspond to the VCC and GND of the two core voltage lines 32.

The voltage stabilizing diode ZD101 forms the voltage stabilizing circuit 8, the chip U103 forms the overvoltage and overcurrent protection circuit 9, and the temperature sensor NTC101 forms the temperature detecting circuit 10.

The resistor R108 is the first voltage dividing resistor 61, the resistor R109 is the second voltage dividing resistor 62, and the resistors R108 and R109 form the voltage detecting circuit 6.

The resistor R111 is the sampling resistor 71, the chip U104 is the integrated operational amplifier chip 72, and the resistor R111 and the chip U104 form the current detecting circuit 7, of course, there are a plurality of filter capacitors C129 and C130.

The LCD screen CON108 is the display screen 4.

The chip MS1793 is the DSP chip 5, the PA3/ADC3 pin of the chip MS1793 is connected to the voltage detecting circuit 6, the PA7/ADC7 pin is connected to the voltage detecting circuit 7, the PA4/ADC4, EN, VCP pins and the like are connected to the overvoltage and overcurrent protection circuit 9, the PA0/ADC0 pin is connected to the temperature detecting circuit 10, the T2C_SCL and T2C_SDA pins are connected to the display 4.

Performing the data line used in a mobile phone of the present invention will bring out the following beneficial effects:

Firstly, in the embodiment of the present invention, since the voltage detecting circuit and the current detecting circuit are disposed on the two core voltage lines of the data line, the voltage and/or current collected by the voltage detecting circuit and the current detecting circuit are transmitted to the display screen for displaying in real time through the DSP chip, so that the voltage and/or current flowing through the data line can be monitored in real time when the mobile phone is charged, the hidden dangers are discovered and eliminated, and the probability of damage during charging of the mobile phone is reduced;

Secondly, in the embodiment of the present invention, since the voltage stabilizing circuit is further disposed on the two core voltage lines of the data line, the high voltage pulse may be prevented from leaking to the mobile phone for causing damage to the mobile phone charging system;

Thirdly, in the embodiment of the present invention, since an overvoltage and an overcurrent circuit are further provided on the two core voltage lines of the data line, when the voltage or current is too high, the connection of the two core voltage lines are actively disconnected, thereby avoiding the damage to the mobile phone charging system caused by overvoltage or overcurrent;

Fourthly, in the embodiment of the present invention, since the temperature detecting circuit is further provided on the two core voltage lines of the data line, when the temperature is too high, the connection of the two core voltage lines are actively disconnected, thereby avoiding the damage to the mobile phone caused by the high temperature.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A data line used in a mobile phone comprising:
a body, a first connection terminal for connecting an external device, a second connection terminal for connecting a mobile phone, and connection lines connecting said first connection terminal and said second connection terminal are disposed inside said body; wherein said connection lines include two core data communication lines for data sending or receiving and two core voltage lines for voltage transferring;
said data line further includes a display screen disposed outside said body, and a DSP chip, a voltage detecting circuit, and/or a current detecting circuit disposed inside said body;
a first end of said DSP chip is connected to a first end of said voltage detecting circuit, a second end of said DSP chip is connected to a first end of said current detecting circuit, and a third end of said DSP chip is connected to said display screen;
a second end of said voltage detecting circuit is connected to one core of said two core voltage lines, and a third end of said voltage detecting circuit is grounded;
a second end and a third end of said current detecting circuit are connected in series to the other core of said two core voltage lines so as to achieve the connection between said first connecting terminal and said second connecting terminal.

2. The data line used in a mobile phone as claimed in claim 1, wherein further includes a voltage stabilizing circuit disposed inside said body, and one end of said voltage stabilizing circuit is connected in parallel with said voltage detecting circuit on the same core voltage line, and the other end is grounded.

3. The data line used in a mobile phone as claimed in claim 2, wherein further includes an overvoltage and overcurrent protection circuit disposed inside said body, said overvoltage and overcurrent protection circuit is connected in series to one core of said two core voltage lines connecting between said first connection terminal and said voltage detecting circuit, thereby achieving connection with said first connection terminal and said voltage detecting circuit, and said overvoltage and overcurrent protection circuit is also connected to a fourth end of said DSP chip.

4. The data line used in a mobile phone as claimed in claim 3, wherein further includes a temperature detecting circuit disposed inside said body, and said temperature detecting circuit is connected with a fifth end of said DSP chip.

5. The data line used in a mobile phone as claimed in claim 4, wherein said voltage detecting circuit includes a first voltage dividing resistor and a second voltage dividing resistor connected in series, one end of said first voltage dividing resistor is connected to one core of said two core voltage lines, the other end of said first voltage dividing resistor is connected with one end of said second voltage dividing resistor to form a joint end which is connected to said first end of said DSP chip, the other end of said second voltage dividing resistor is grounded.

6. The data line used in a mobile phone as claimed in claim 5, wherein said current detecting circuit includes a sampling resistor in parallel with an integrated operational amplifier chip, said sampling resistor is also connected in series with the other core of said two core voltage lines to achieve the connection with the said connection terminal and said second connection terminal, said integrated operational amplifier chip is also connected to said second end of said DSP chip.

7. The data line used in a mobile phone as claimed in claim 6, wherein the interface type of said first connection terminal is USB-TYPE-A or USB-TYPE-B.

8. The data line used in a mobile phone as claimed in claim 7, wherein the interface type of said second connection terminal is any of micro USB, micro USB to Lightning and micro USB to USB-TYPE-C.

9. The data line used in a mobile phone as claimed in claim 8, wherein said voltage stabilizing circuit is formed by a voltage stabilizing diode of the type ZD101, said overvoltage and overcurrent protection circuit is formed by an overvoltage/overcurrent protection chip of the type SGM2525, and said temperature detecting circuit is formed by a temperature sensor of the type NTC101.

10. The data line used in a mobile phone as claimed in claim 9, wherein the type of said DSP chip is MS1793 which is provided with ADC pins respectively connected to said voltage detecting circuit, said current detecting circuit, said overvoltage and overcurrent protection circuit and said temperature detecting circuit, GPIO and I2C pins connected to said display screen and integrated with Bluetooth communication function, said integrated operational amplifier chip is of the type SGM8477, said first voltage dividing resistor has a resistance of 1 MΩ, said second voltage dividing resistor has a resistance of 100 KΩ.

* * * * *